Figure 1:
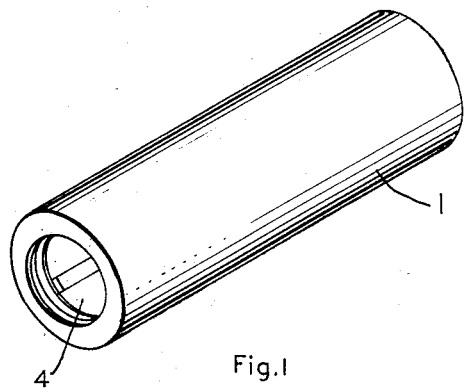

April 7, 1959

E. E. LYNCH 2,881,326

CONDENSER ELECTRODE MOUNTING

Filed Dec. 30, 1954

2 Sheets-Sheet 1

Inventor:
Edward E. Lynch
by, *F. Gerald Toye*
His Attorney

April 7, 1959        E. E. LYNCH        2,881,326
CONDENSER ELECTRODE MOUNTING

Filed Dec. 30, 1954        2 Sheets-Sheet 2

Inventor:
Edward E. Lynch
by. *[signature]*
His Attorney

United States Patent Office 2,881,326
Patented Apr. 7, 1959

2,881,326

CONDENSER ELECTRODE MOUNTING

Edward E. Lynch, Wakefield, Mass., assignor to General Electric Company, a corporation of New York Application December 30, 1954, Serial No. 478,571

8 Claims. (Cl. 250—83.3)

My invention relates to capacitors, and in particular to capacitors of the gas dielectric type requiring an electrode or plate mounting with a very high electrical insulation resistance for the purpose of retaining an electrical charge on the electrodes thereof for relatively long periods of time.

Highly insulated capacitors of the aforementioned type are useful in radiation instruments and similar devices for determining the extent and severity of exposure to radiation over a given period of time. In devices of this type, the total radiation exposure is often determined by measuring the extent to which an initially charged capacitor has discharged from a given electrical potential level, the discharge being caused by ionization of the capacitor dielectric gas as a result of exposure of the capacitor to ionizing radiation. The construction of such capacitors frequently takes the form of an inner electrode wire or rod running through the center of a conducting cylinder.

It will be realized that with the aforementioned construction, it is, of course, necessary to provide an insulating mounting for the purpose of positioning and supporting the inner electrode in the metallic cylinder. The accuracy of the capacitor as a sensing device for determining exposure to radiation over a given period is, therefore, to a great extent dependent on the insulating resistance of the inner electrode supporting arrangement. In other words, if the amount by which the capacitor has discharged is to be an accurate indication of the total radiation to which the capacitor has been exposed, then the amount by which the capacitor may discharge by reason of leakage through the inner electrode mounting arrangement must be severely limited and controlled.

A second consideration in the design of capacitors of the aforementioned type arises from the tendency of the potential distribution throughout the capacitor to shift or change in pattern as a result of changes in the internal stress and strain distribution patterns in the electrode mounting. Such internal stresses and strains are frequently introduced in the manufacture of the electrode mounting members, particularly in the molding processes by which such materials are commonly formed, wherein internal stresses and strains result upon cooling and contracting of the molded articles from their molding temperatures.

When such insulators are installed in a capacitor, gradual shifting and changing of the internal stress and strain distribution pattern resulting from normal yielding of the material, aging, temperature changes and so forth results in a corresponding shift in relationships within the material thereby causing the potential distribution pattern to change. Changes in the potential distribution pattern by reason of changes in internal stresses or strains have been so severe that it has been observed, in some cases, that the measured potential across the capacitor electrodes actually increased in magnitude over that measured with the original charge distribution.

Stresses and strains may also be introduced in the mounting insulation during the process of assembly where, in the tightening of the insulators in place with screw arrangements or by means of shrinking the insulators on the electrode in a molding process, direct strains appear on the surface of the insulators and are transmitted internally.

It will be appreciated therefore, that the accuracy of radiation measurement with arrangements of the type just described is directly dependent upon minimization of stresses and strains in the insulating mounting arrangement for the niner electrode of the capacitor.

In view of the foregoing, it is accordingly one object of my invention to provide an improved capacitor of the aforementioned type in which the electrical insulation resistance to charge leakage between a center electrode and an outer conducting cylinder is greatly increased over values heretofore obtainable with other forms of construction.

It is another object of my invention to provide an improved capacitor electrode mounting arrangement which minimizes shifting in the potential distribution pattern from the initial charge pattern, which shifting otherwise would be likely to occur by reason of changes in internal or external stress and strain distribution patterns in the electrode mounting.

It is a further object of my invention to provide an improved electrode mounting arrangement for a capacitor of the above-mentioned type, which improved arrangement provides for adjustment of the electrode mounting to allow minimization of external stresses on the mounting to the point where such stresses are due essentially only to the weight of the electrode itself while, at the same time, provides a rigid support for the electrode.

It is still a further object of my invention to provide an improved construction for mounting the inner electrode in a capacitor of the above described type, which construction provides for a minimization of the contact area between the mounting and the electrode.

Briefly stated, I provide, in accordance with one aspect of my invention, an improved capacitor electrode mounting in which an inner electrode is supported within an outer, conducting cylinder by means of a series of insulating spheres which directly engage the electrode at various points along suitable surfaces provided on the electrode and which are in turn mounted in positioning and supporting members supported in the outer cylinder. Means are provided for adjusting the supporting members on which the insulating spheres are mounted so that these members may be adjusted to the point where the spheres engage and support the electrode with a minimum of external stress and strain on the spheres.

With the arrangement just described, any shifting in the potential pattern is greatly reduced not only by reason of the fact that the spheres represent the optimum in symmetry from the standpoint of minimizing stresses and strains induced in the manufacturing process but also since the construction permits assembly in a manner such that externally induced stresses and strains are minimized.

The spherical supporting members also provide for a minimum of contact area between the supporting structure and the electrode thereby further contributing to a higher insulating resistance between the inner electrode and the outer cylinder.

Other objects and advantages of my invention will be apparent from the following description taken in connection with the accompanying drawings, and its scope will be pointed out in the appended claims.

Figure 2:
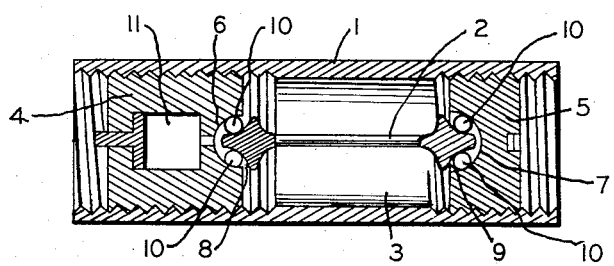
Figure 3:
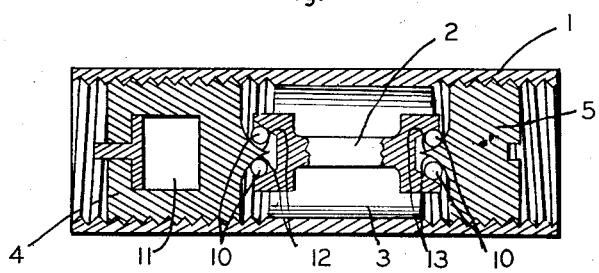

Referring to the drawings, Fig. 1 is a perspective view of a pocket radiation meter or dosimeter embodying my invention; Fig. 2 is a cross sectional view of the dosimeter of Fig. 1; while Figs. 3, 4, 5 and 6 are cross sectional views of dosimeters illustrating various alternative embodiments of my invention.

Forming a part of the radiation meter, or dosimeter, of Figs. 1 and 2 is a capacitor of the type commonly employed in such meters and comprising an outer cylindrical casing 1, an inner electrode member 2 extending longitudinally within the outer casing, and a gas dielectric 3 between the casing 1 and the electrode 2. The outer casing 1 is formed of an electrically conducting material, although it will be understood that the same result is obtained if the outer casing is formed of an electrically insulating material provided with a conductive layer over at least a portion of the inner surface thereof.

As has been pointed out, in a capacitor of the type intended for use in radiation meters, it is necessary for the proper functioning of the meter that the insulating resistance of the electrode mounting be high enough to prevent any appreciable amounts of leakage of the charge between the electrode 2 and the cylinder 1. In addition, it is important to ensure against shifting of the potential pattern in the electrode mounting, which shifting, as explained above, causes changes in the measured potential difference between the inner electrode and the outer cylinder and thus causes erroneous indications as to the amount of radiation to which the capacitor has been exposed.

Accordingly my invention contemplates, in accordance with one aspect thereof, a mounting arrangement for the inner electrode of a capacitor of the aforementioned type, in which the above and other objects and advantages are realized. In carrying my invention into effect, I provide, as shown in Fig. 2, a pair of mounting members 4 and 5 which are threaded into opposite ends of the outer cylinder 1 so as to be longitudinally adjustable therein, and which are provided therein with recessed portions or cavities 6 and 7 respectively. The mounting members 4 and 5 are preferably formed of an electrically conductive material for reasons hereinafter set forth.

At opposite ends of the inner electrode 2 I provide tapered surfaces 8 and 9 which are shaped so as to cooperate with the cavities 6 and 7 and engage a plurality of supporting spheres 10, which are formed of an insulating material such as injection molded polystyrene. Stability of the mounting may be obtained by providing at least three of the spherical insulators 10 at each end of the inner electrode 2, and for reasons of minimizing the contact area between the mounting and the electrode, this minimum number of spheres will normally be preferred.

Means operable from the exterior of the casing 1 may be positioned in an area 11 to allow initial charging of the capacitor and to permit electrical contact to be made with the inner electrode 2 for the purpose of measuring the charge. A considerable variety of such arrangements are well known to those skilled in the art.

It will be seen that, with the electrode mounting arrangement described above, both of the mounting plugs 4 and 5 can be adjusted along the axis of the casing 1 so that the electrode 2 can be properly positioned axially within the casing 1 and further that the mounting pressure on the insulators 10 can be adjusted by movement of one of the mounting plugs 4 and 5 relative to the other. Thus end play in the mounting can be readily adjusted without the application of excessive pressure to the insulators 10. This last feature is important not only from the standpoint of preventing excessive deformation of the insulating spheres so that the area of contact between the spheres and the electrode is minimized, but also from the standpoint of minimizing externally induced stresses and strains in the spheres which, as pointed out above, have a tendency to cause shifting in the potential pattern within the insulators.

It will be further appreciated that, with my mounting arrangement, the problem of shifting in the potential pattern or distribution within the electrode mounting by reason of changes in internal stresses and strains is greatly alleviated, since the spherically shaped insulators 10 represent an optimum shape, from the standpoint of symmetry, in avoiding the inducement of internal stresses and strains therein during the molding and forming processes. And it will be observed that with the mounting plugs 4 and 5 formed of an electrically conducting material, substantially the entire potential difference between the casing 1 and the electrode 2 occurs across the spherical insulators 10 so that errors resulting from shifting in the insulation potential patterns are thus greatly minimized.

It will be understood that the plugs 4 and 5 may be formed of an insulating material and that some of the advantages inherent in my invention will still be derived although a construction which provides for the application of substantially the full potential of the capacitor charge across the symmetrical, spherically shaped insulators is a preferable one.

It will be appreciated that my invention may take other forms than the one shown in Figs. 1 and 2. By way of example, I have shown, in Figs. 3, 4, 5 and 6, several modifications of the arrangement shown in cross section in Fig. 2. For convenience I have used like reference numerals in the various arrangements shown in Figs. 3, 4, 5 and 6 in order to designate elements or portions similar to those shown in Fig. 2.

For instance, each of these arrangements comprises an outer conducting casing 1 and an electrode memer 2 extending therein and provided with mounting surfaces 8 and 9 thereon. As has been pointed out above, the outer casing 1 may be formed of an electrically insulating material provided with a conducting inner surface if so desired. It will be observed that the arrangements shown in Figs. 4 and 6, the mounting members 4 and 5 are provided with cavities 6 and 7, as in Fig. 2, to receive the spherical insulators 10, whereas in Figs. 3 and 5, the mounting plugs 4 and 5 are provided with tapered surfaces 12 and 13 which cooperate as shown with tapered surfaces 8 and 9 on the electrode.

Figure 5:
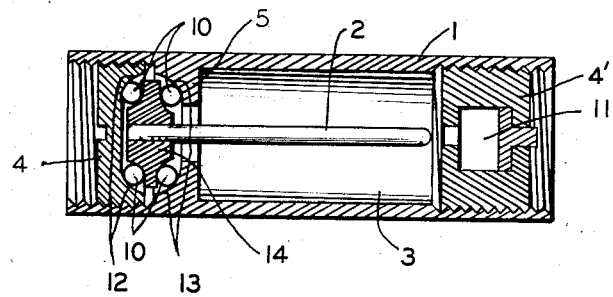
Figure 6:
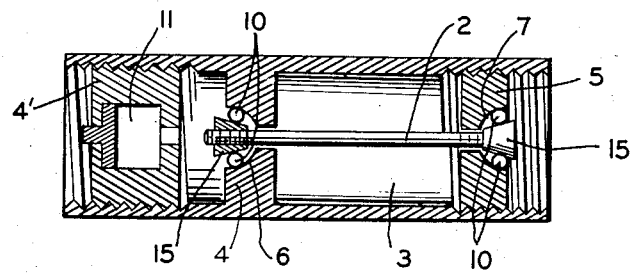

It will be seen also that, in the arrangement shown in Fig. 5, the mounting member 5 is formed integrally with the casing 1, whereas in Fig. 6, the mounting member 4 is formed integrally with the casing. In the construction shown in Fig. 5, the electrode member 2 includes a flange portion 14 which is pressed onto the end of the electrode and which bears the supporting surfaces 8 and 9. In the arrangement of Fig. 6, the electrode member 2 is also formed of several parts, having a pair of removable end pieces 15 threaded onto the ends thereof as shown.

Figure 4:
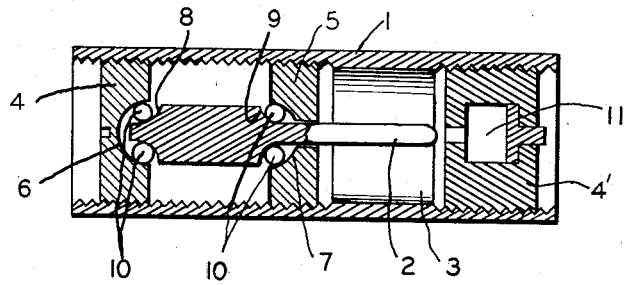

It will also be observed that in the constructions illustrated in Figs. 4, 5 and 6, a separate plug $4^1$ is in each case provided to form a closure for the end of the outer casing 1.

It will be appreciated from the foregoing that various changes, substitutions and modifications may be made in the particular embodiments of my invention set forth herein without departing from the true scope of my invention as defined in the appended claims.

What I claim as new and desire to secure by Letters Patent of the United States is:

1. A capacitor comprising an outer casing, an inner electrode member having an elongated portion extending longitudinally within said casing in spaced relationship thereto, and means for supporting said electrode in said casing including a plurality of substantially spherically shaped insulating members supported in said casing and positioned to engage said electrode member in supporting relationship thereto and minimize the contact area between said electrode member and said supporting means.

2. A capacitor comprising an outer casing, an inner electrode member having an elongated portion extending longitudinally within said casing in spaced relationship thereto, said electrode member being provided with supporting surfaces thereon, and a plurality of substantially spherically shaped insulators supported in said casing and positioned to engage said supporting surfaces on said electrode member to support said electrode member in said casing while presenting a minimum contact area between said inner electrode member and said spherically shaped insulators.

3. A capacitor comprising an outer casing, an inner electrode member having an elongated portion extending longitudinally within said casing in spaced relationship thereto, said electrode member being provided with longitudinally tapered surfaces thereon, and a plurality of substantially spherically shaped insulators supported in said casing and positioned to engage said tapered surfaces to thereby support said electrode member in said casing and minimize the contact area between said longitudinally tapered surfaces and said insulators.

4. A capacitor for use in radiation instruments and the like comprising an outer tubularly shaped casing, a pair of supports spaced apart longitudinally within said casing, an elongated electrode extending within said casing in spaced relation thereto between said supports, said electrode having longitudinally tapered surfaces in the vicinity of said supports, and at least three substantially spherically shaped insulating members mounted in each of said supports so as to be engageable with said tapered surfaces on said electrode in supporting relationship thereto.

5. A capacitor for use in radiation instruments and the like comprising an outer tubular conductor, a pair of supports spaced apart within said tubular conductor, an elongated electrode extending axially within said tubular conductor in spaced relation thereto and between said supports, said electrode being provided with longitudinally tapered surfaces thereon at the extremities thereof, and at least three spherically shaped insulators supported in each of said supports and engaging said tapered surfaces on said electrode in supporting relationship thereto.

6. A capacitor for use in radiation instruments and the like comprising an outer tubularly shaped conducting member, a pair of supports spaced apart longitudinally within said conducting member, an elongated electrode extending within said conducting member in spaced relation thereto between said supports, said electrode having longitudinally tapered surfaces in the vicinity of said supports, at least three substantially spherically shaped insulators mounted in each of said supports so as to be engageable with said tapered surfaces on said electrode in supporting relationship thereto, and manually adjustable means for varying the axial distance between said supports to allow adjustment of the contact pressure on said insulators.

7. A capacitor of the gas dielectric type for use in detecting ionizing radiation comprising an outer tubular conductor, an electrode member having an elongated portion extending axially within said tubular conductor in spaced relationship thereto, a pair of spaced apart longitudinally tapered surfaces on said electrode member, a pair of spaced apart supports mounted within said tubular conductor, one each of said supports being positioned in the vicinity of one of said tapered surfaces on said electrode member and having a cooperating tapered surface thereon, at least three substantially spherically shaped insulators positioned between each set of cooperating surfaces on said electrode member and said supports to thereby support said electrode member in said tubular conductor, and manually adjustable means for longitudinally adjusting at least one of said supports to permit adjustment of the contact pressure on said insulators.

8. A radiation dosimeter comprising an outer tubular conductor, a pair of supports spaced apart within said tubular conductor, each of said supports having a recess therein, an elongated electrode member extending longitudinally within said tubular conductor in spaced relation thereto and between said supports, said electrode member being provided with longitudinally tapered surfaces thereon in the vicinity of said supports, at least three substantially spherically shaped insulators in each of said recesses, said insulators being engageable with the tapered surfaces on said electrode in the vicinity of said supports to support said electrode in said tubular conductor, and manually adjustable means for longitudinally adjusting at least one of said supports to bring said insulators into supporting engagement with said electrode member and to adjust the contact pressure on said insulators.

References Cited in the file of this patent

UNITED STATES PATENTS

| | | |
|---|---|---|
| 2,573,999 | Victoreen | Nov. 6, 1951 |
| 2,648,025 | Agule | Aug. 4, 1953 |
| 2,782,337 | Robinson | Feb. 19, 1957 |